US012638540B2

(12) United States Patent
Chen et al.

(10) Patent No.: US 12,638,540 B2
(45) Date of Patent: May 26, 2026

(54) COOPERATIVE POSITIONING METHOD AND APPARATUS, DEVICE, AND STORAGE MEDIUM

(71) Applicant: ZTE CORPORATION, Shenzhen (CN)

(72) Inventors: Dawei Chen, Shenzhen (CN); Shijun Chen, Shenzhen (CN); Lingfei Jin, Shenzhen (CN); Luyan Qian, Shenzhen (CN); Junqiang Li, Shenzhen (CN); Yang Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 279 days.

(21) Appl. No.: 17/785,640

(22) PCT Filed: Mar. 3, 2021

(86) PCT No.: PCT/CN2021/078794
§ 371 (c)(1),
(2) Date: Jun. 15, 2022

(87) PCT Pub. No.: WO2021/203871
PCT Pub. Date: Oct. 14, 2021

(65) Prior Publication Data
US 2023/0077304 A1 Mar. 9, 2023

(30) Foreign Application Priority Data
Apr. 10, 2020 (CN) .......................... 202010280268.0

(51) Int. Cl.
*G01S 5/02* (2010.01)
*G06F 17/16* (2006.01)

(52) U.S. Cl.
CPC .......... *G01S 5/0278* (2013.01); *G01S 5/0244* (2020.05); *G01S 5/0257* (2013.01); *G01S 5/0289* (2013.01); *G01S 5/0294* (2013.01); *G06F 17/16* (2013.01)

(58) Field of Classification Search
CPC .... G01S 5/0257; G01S 5/0278; G01S 5/0244; G01S 5/0289; G01S 5/0294; G06F 17/12; G06F 17/16; G06F 17/18
(Continued)

(56) References Cited

U.S. PATENT DOCUMENTS

| | | | | |
|---|---|---|---|---|
| 7,155,237 B2 * | 12/2006 | Porcino | .................... | G01S 5/12 |
| | | | | 342/450 |
| 7,187,327 B2 * | 3/2007 | Coluzzi | .................... | G01S 5/06 |
| | | | | 342/458 |

(Continued)

FOREIGN PATENT DOCUMENTS

| | | |
|---|---|---|
| CN | 103969622 A | 8/2014 |
| CN | 105137391 A | 12/2015 |

(Continued)

OTHER PUBLICATIONS

Chen et al. "Indoor Location Based on Improved Chan Algorithm and Taylor Algorithm," Computer Knowledge and Technology, vol. 17, No. 1, Jan. 2021, pp. 1-6.

(Continued)

*Primary Examiner* — Chuong P Nguyen
(74) *Attorney, Agent, or Firm* — Vivacqua Crane, PLLC

(57) ABSTRACT

Disclosed are a cooperative positioning method and apparatus, a device, and a non-transitory computer-readable storage medium. The method may include: determining an initial positioning estimated value of each of a plurality of objects to be measured by a simulated annealing algorithm and a first preset positioning algorithm; screening at least
(Continued)

Determine an initial positioning estimated value of an object to be measured by a simulated annealing algorithm and a first preset positioning algorithm — S110

Screen at least two distance measurement values based on a preset error threshold to obtain a target distance measurement value — S120

Determine a position of the object to be measured according to a multi-target-source Taylor series algorithm, the target distance measurement value and the initial positioning estimated value — S130 two distance measurement values based on a preset error threshold to obtain a target distance measurement value, where the at least two distance measurement values are measurement values obtained by measuring a distance between each object to be measured and each of a plurality of target base stations for at least two times; and determining a position of each object to be measured according to a multi-target-source Taylor series algorithm, each target distance measurement value and each initial positioning estimated value.

9 Claims, 5 Drawing Sheets

(58) Field of Classification Search
USPC ........................................ 342/451, 450, 458
See application file for complete search history.

(56) References Cited

U.S. PATENT DOCUMENTS

| | | | | |
|---|---|---|---|---|
| 7,429,951 | B2 * | 9/2008 | Kennedy, Jr. ........ | H04B 1/1081 |
| | | | | 342/465 |
| 8,489,114 | B2 * | 7/2013 | Zhang ........................ | G01S 5/06 |
| | | | | 370/328 |
| 8,824,325 | B2 * | 9/2014 | Zhang ................... | G01S 5/0257 |
| | | | | 370/252 |
| 10,939,406 | B1 * | 3/2021 | Wu ........................ | G01S 5/0242 |
| 2012/0165012 | A1 | 6/2012 | Fischer et al. | |
| 2012/0314587 | A1 * | 12/2012 | Curticapean .......... | G01S 5/0284 |
| | | | | 370/252 |
| 2015/0201309 | A1 | 7/2015 | Liu | |
| 2024/0168172 | A1 * | 5/2024 | Gao ........................ | G01S 19/43 |

FOREIGN PATENT DOCUMENTS

| | | | | | |
|---|---|---|---|---|---|
| CN | 105203106 | A | 12/2015 | | |
| CN | 109186609 | A | 1/2019 | | |
| CN | 109375165 | A | 2/2019 | | |
| CN | 109541546 | A | 3/2019 | | |
| CN | 109709513 | A | 5/2019 | | |
| CN | 107613458 | B | * 11/2019 | .............. | H04W 4/02 |
| CN | 111896914 | A | 11/2020 | | |
| CN | 113567925 | A | * 10/2021 | ........... | G01S 5/0294 |
| CN | 117761616 | A | * 3/2024 | .............. | G01S 5/02 |
| EP | 3967087 | B1 | * 2/2024 | .............. | G01S 11/06 |
| JP | H09288160 | A | 11/1997 | | |
| JP | 2016090311 | A | 5/2016 | | |
| KR | 101589269 | B1 | 1/2016 | | |
| WO | 2012016355 | A1 | 2/2012 | | |

OTHER PUBLICATIONS

Chen et al. "Research of TDOA Cooperative Location Algorithm Based on Chan and Taylor," Computer Science, vol. 38, No. 10A, Oct. 2011, pp. 1-4.

International Searching Authority. International Search Report and Written Opinion for PCT Application No. PCT/CN2021/078794 and English translation, mailed Jun. 1, 2021, pp. 1-15.

Lin et al. "Improvement Cooperative Calculating Algorithm for Target Location," Journal of Chinese Computer Systems, vol. 38, No. 10, 2017, pp. 2216-2220.

Peng et al. "Research on Application of TDOA Wi-Fi Positioning Based on Adaptive Genetic Algorithm," IEEE 4th Information Technology and Mechatronics Engineering Conference, 2018, pp. 1086-1089.

Qian, Li. "Research on Unmanned Vehicle Positioning Technology in Terminal," dissertation submitted to Changchun University of Science and Technology, Mar. 2020, pp. 1-63.

Wang et al. "Position Location Solution Algorithm Based on Data Fusion," Computer Engineering and Design, 2009, pp. 4921-4927.

Chang, X., et al., "Three-Dimensional Positioning of Wireless Communication Base Station," IEEE IAECA Conference, Oct. 2017, pp. 2727-2732.

Intellectual Property India. Examination Report for IN Application No. 202227038082 and English translation, mailed Nov. 22, 2022, pp. 1-7.

Japan Patent Office. Notice of Reasons for Refusal for JP Application No. 2022-535910 and English translation, mailed Mar. 15, 2023, pp. 1-8.

Li, H., et al., "Combination of Taylor and Chan method in Mobile Positioning," Proceedings of the 2011 10th IEEE International ConferenceOn Cybernetic Intelligent Systems, 2011, pp. 104-110.

Li, H., et al., "Wireless Location for Indoor Based on UWB," Proceedings of the 34th Chinese Control Conference, Jul. 2015, pp. 6430-6433.

European Patent Office. Extended European Search Report for EP Application No. 21785628.5, mailed Mar. 26, 2024, pp. 1-9.

The State Intellectual Property Office of People's Republic of China. First Office Action for CN Application No. 202010280268.0 and English translation, mailed Oct. 15, 2024, pp. 1-20.

The State Intellectual Property Office of People's Republic of China. First Search Report for CN Application No. 202010280268.0 and English translation, mailed Sep. 29, 2024, pp. 1-8.

Zhou, X., et al. "A Fast Multi-Target Track Initialization Algorithm Based on TDOA Measurements," Electronics Optics & Control, vol. 17, No. 11, Nov. 2010, pp. 1-4.

* cited by examiner

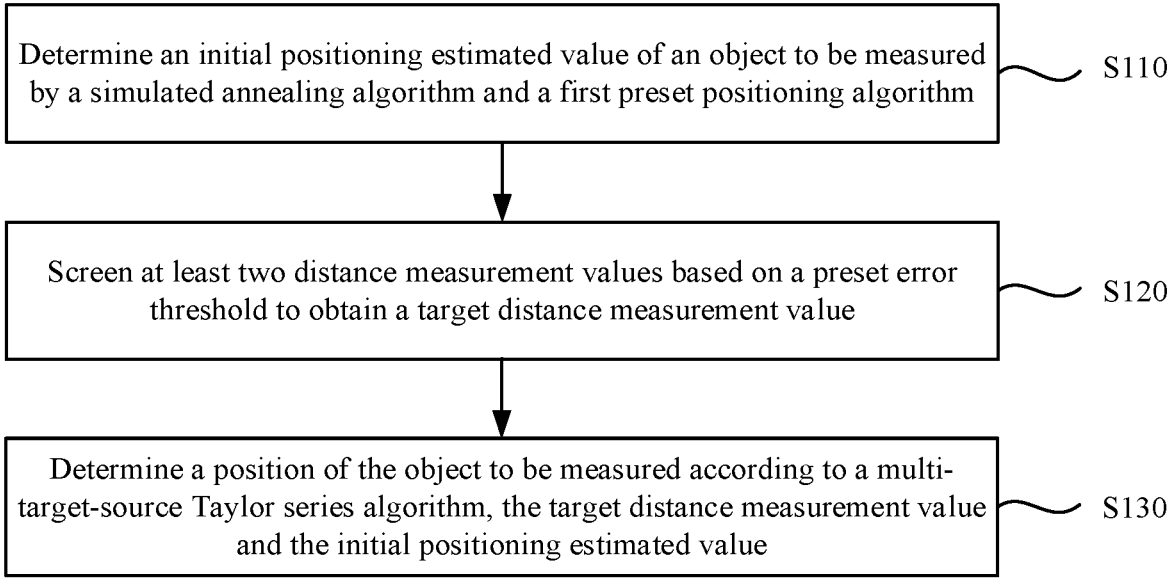

| Determine an initial positioning estimated value of an object to be measured by a simulated annealing algorithm and a first preset positioning algorithm | S110 |

| Screen at least two distance measurement values based on a preset error threshold to obtain a target distance measurement value | S120 |

| Determine a position of the object to be measured according to a multi-target-source Taylor series algorithm, the target distance measurement value and the initial positioning estimated value | S130 |

FIG. 1

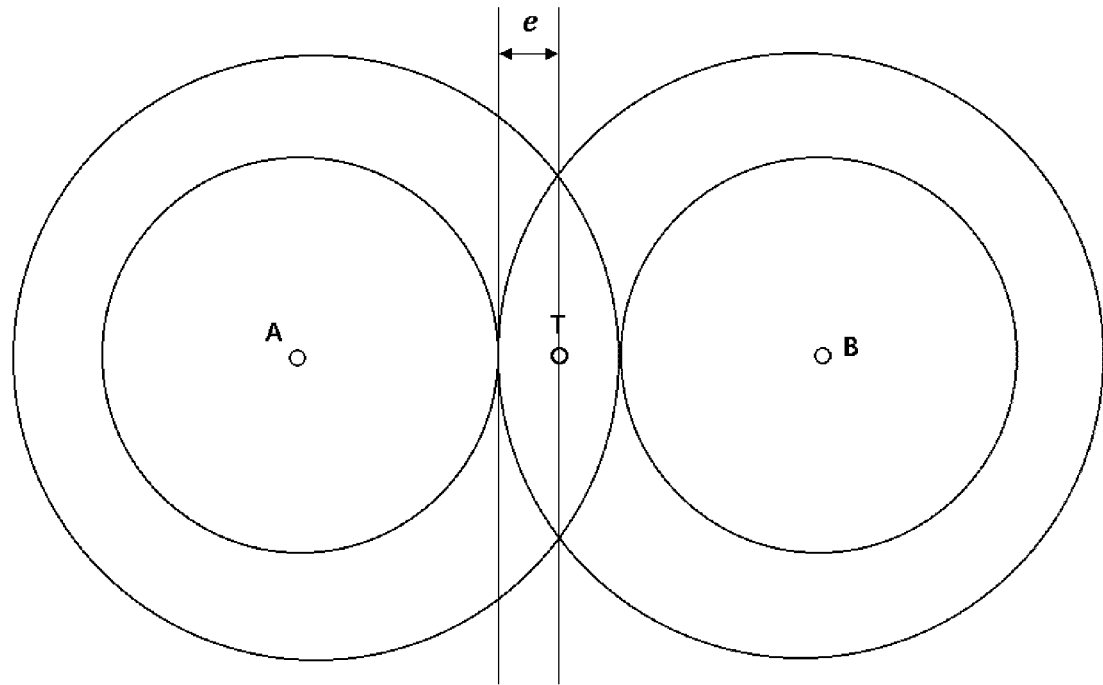

FIG. 2

| Algorithm | Chan Algorithm | Chan Algorithm + Taylor Algorithm | Improved Chan algorithm + Taylor algorithm |
|-----------|----------------|-----------------------------------|--------------------------------------------|
| Error | 3m | 1m | 0.49m |

COOPERATIVE POSITIONING METHOD AND APPARATUS, DEVICE, AND STORAGE MEDIUM

CROSS REFERENCE TO RELATED APPLICATIONS

This application is a national stage filing under 35 U.S.C. § 371 of international application number PCT/CN2021/078794, filed Mar. 3, 2021, which claims priority to Chinese patent application No. 202010280268.0, filed Apr. 10, 2020. The contents of these applications are incorporated herein by reference in their entirety.

TECHNICAL FIELD

The present application relates to the field of positioning, for example, to a cooperative positioning method, a cooperative positioning apparatus, a device and a non-transitory computer-readable storage medium.

BACKGROUND

With the advent of the Global Position System (GPS), the positioning demand becomes increasingly important in people's daily life. Among the conventional positioning algorithms, Taylor series expansion is one of the best solutions for nonlinear equations. However, the Taylor algorithm has two disadvantages. The first is sensitivity to the initial value, and the initial value for iteration has a great impact on the Taylor algorithm. The second is the possibility of non-convergence.

SUMMARY

Embodiments of the present disclosure provides a cooperative positioning method, a cooperative positioning apparatus, a device and a non-transitory computer-readable storage medium, for positioning an object to be measured in a high accuracy.

According to an embodiment of the present disclosure provided is a cooperative positioning method, the method includes:

determining an initial positioning estimated value of an object to be measured by a simulated annealing algorithm and a first preset positioning algorithm; screening at least two distance measurement values based on a preset error threshold to obtain a target distance measurement value, the at least two distance measurement values being distances obtained by measuring the distance between the object to be measured and a target base station for at least two times; and, determining a position of the object to be measured according to a multi-target-source Taylor series algorithm, the target distance measurement value and the initial positioning estimated value.

Another embodiment of the present disclosure further provided is a cooperative positioning apparatus, the apparatus includes:

a first determination module configured to determine an initial positioning estimated value of an object to be measured by a simulated annealing algorithm and a first preset positioning algorithm; a second determination module configured to screen at least two distance measurement values based on a preset error threshold to obtain a target distance measurement value, the at least two distance measurement values being distances obtained by measuring the distance between the object to be measured and a target base station for at least two times; and, a third determination module configured to determine a position of the object to be measured according to a multi-target-source Taylor series algorithm, the target distance measurement value and the initial positioning estimated value.

Yet another embodiment of the present disclosure further provided is a device, the device includes a memory and one or more processors. The memory is configured to store one or more programs which, when executed by the one or more processors, cause the one or more processors to implement the cooperative positioning method described above.

Yet another embodiment of the present disclosure further provided is a non-transitory computer-readable storage medium storing computer programs which, when executed by a processor, causes the processor to implement the cooperative positioning method described above.

BRIEF DESCRIPTION OF DRAWINGS

FIG. 1 is a flowchart of a cooperative positioning method according to an embodiment of the present disclosure;

FIG. 2 is a schematic diagram showing a theoretical distance measurement value range according to an embodiment of the present disclosure;

DETAILED DESCRIPTION

Figures 3, 4:
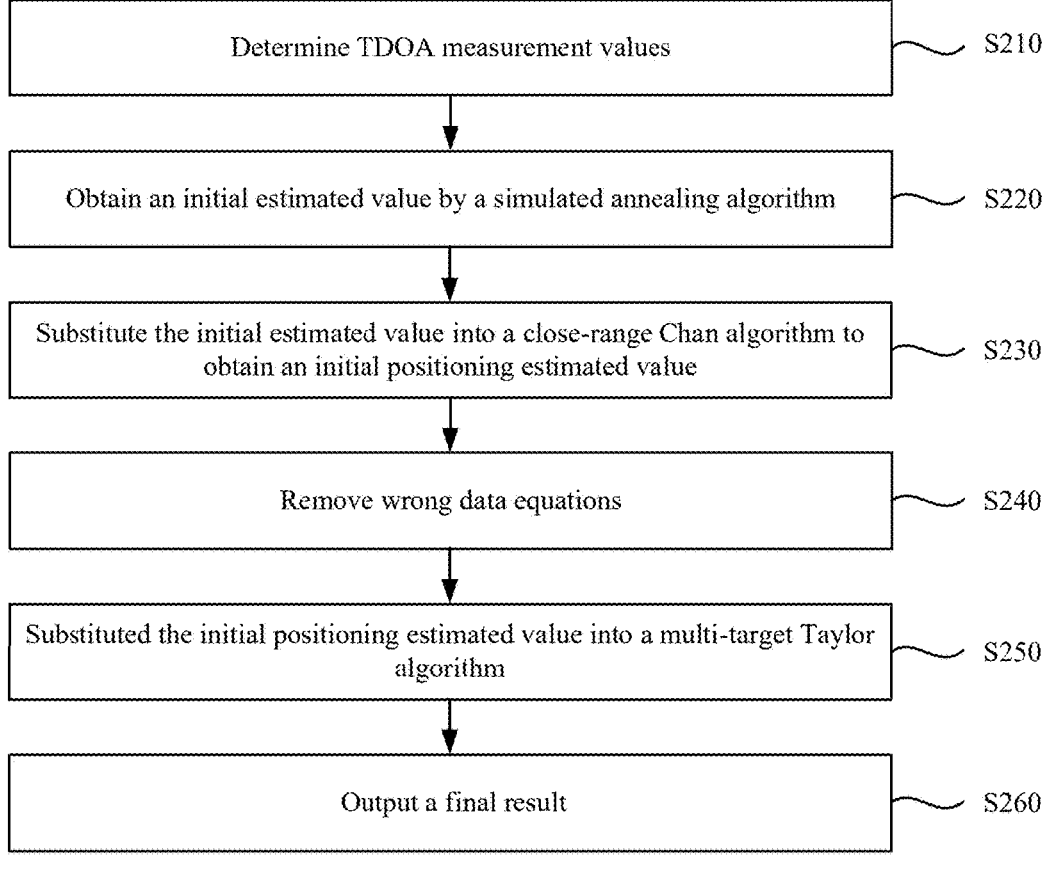
FIG. 3 is a flowchart of another cooperative positioning method according to an embodiment of the present disclosure.
FIG. 4 is a diagram showing analysis of errors of different algorithms according to an embodiment of the present disclosure.

The embodiments of the present disclosure will be described below with reference to the accompanying drawings.

Among the conventional positioning algorithms, Taylor series expansion is one of the best solutions for nonlinear equations. Due to the high solution accuracy and fast iteration speed, Taylor series expansion becomes one of the most commonly used positioning algorithms. The Taylor algorithm has two disadvantages. The first is sensitivity to the initial value, and the initial value for iteration has a great impact on the Taylor algorithm. The second is the possibility of non-convergence. The solution is to adopt various algorithms for cooperative positioning. An initial positioning value is firstly obtained by one algorithm, and then substituted into the Taylor series expansion to obtain an accurate solution.

In a Time Difference of Arrival (TDOA) positioning algorithm model, after a plurality of TDOA measured values are obtained by delay estimation, a set of positioning equations may be established:

$$R_{i,j} = c\Delta\tau_i = \sqrt{(x_i - x_j)^2 + (y_i - y_j)^2}. \tag{1}$$

In terms of the solution of the initial value, the initial positioning value is generally obtained by a Chan algorithm. When measurement errors obey the Gaussian distribution, the Chan algorithm is accurate in positioning and low in complexity. The Chan algorithm adopts two-step Weighted Least Squares (WLS). Firstly, variables are assumed to be independent of each other, and estimated values of the variables are obtained. Then, the relationship among the variables is taken into consideration to obtain the target position.

$$h = \begin{bmatrix} R_1^2 - K_1 \\ R_2^2 - K_2 \\ \vdots \\ R_N^2 - K_N \end{bmatrix} Z_a = \begin{bmatrix} x \\ y \\ R \end{bmatrix} G_a = \begin{bmatrix} -2x_1 & -2y_1 & 1 \\ -2x_2 & -2y_2 & 1 \\ \vdots & \vdots & \vdots \\ -2x_N & -2y_N & 1 \end{bmatrix}, \tag{2}$$

where x, y and R are the estimated values of the coordinates of the object to be measured and the distance between the object to be measured and the base station, respectively.

If an error vector is defined as $\psi = h - G_a Z_a$, then:

$$\phi = E[\psi\psi^T] \approx c^2 BQB. \tag{3}$$

A first diagonal matrix $B = \text{diag}\{r_1, r_2, \ldots, r_N\}$, $r_1$, $r_2, \ldots, r_N$ is a real distance between the base station i and the object to be measured, and $$Q = \text{diag}\{\sigma_1^2, \sigma_2^2, \ldots, \sigma_N^2\}$$

is a noise vector covariance matrix complying with the Gaussian distribution. If the quantities in $Z_a$ are assumed to be independent of each other, the following is obtained by WLS:

$$Z_a = (G_a^T \phi^{-1} G_a)^{-1} G_a^T \phi^{-1} h. \tag{4}$$

Since there is a distance between a Mobile Station (MS) and a base station detector in B, $\phi$ is an unknown quantity that needs to be calculated.

In a case where the object to be measured is far away from the base station, Q may be used instead, and the above formula may be approximated as follows:

$$Z_a \approx (G_a^T Q^{-1} G_a)^{-1} G_a^T Q^{-1} h. \tag{5}$$

In a case where the object to be measured is close to the base station, the object to be measured is assumed to be far away from the base station, and a rough initial solution is then obtained by utilizing the above formula. The B matrix may be calculated by utilizing this initial solution, and the results of first WLS and second WLS are then calculated.

The assumption in the Chan algorithm is based on a Gaussian distribution with a measurement error of zero mean. For a measured value with a large error in an actual environment, for example, in an environment with a Non-Line Of Sight (NLOS) error, the performance of this algorithm will degrade.

In terms of the Taylor positioning solution, the positioning accuracy is affected by the distance measurement error and the number of observation equations. The smaller the distance measurement error is, the more the observation equations are, and the better the positioning effect is. The data with large errors may be eliminated by certain means. Meanwhile, the positioning algorithm generally establishes the observation equations for measuring the distance between a terminal and a base station. In the case of a small number of base stations, the number of equations is limited, and the positioning effect is not remarkable. In view of this, an embodiment of the present disclosure provides a cooperative positioning method, which realizes high-accuracy positioning of an object to be measured according to an improved Chan algorithm of the simulated annealing algorithm and a Taylor series algorithm.

In an embodiment, FIG. 1 is a flowchart of a cooperative positioning method according to the embodiment of the present disclosure. This embodiment is applicable to a situation where an object to be measured is cooperatively positioned by utilizing at least two algorithms. The cooperative positioning method in this embodiment includes steps S110 to S130.

At S110, an initial positioning estimated value of an object to be measured is determined by a simulated annealing algorithm and a first preset positioning algorithm.

In the embodiment, the first preset positioning algorithm is a Chan algorithm. The Chan algorithm is a positioning algorithm based on the TDOA technology, which has an analytical expression solution and has good performance when TDOA errors comply with an ideal Gaussian distribution. In the embodiment, the object to be measured refers to a terminal to be measured. For example, the terminal to be measured may be a user equipment (UE) to be positioned. In the embodiment, the initial positioning estimated value of the object to be measured is cooperatively determined by the simulated annealing algorithm and the Chan algorithm, so as to obtain the accurate position of the object to be measured. The simulated annealing algorithm has the advantages of high local search capability and short operation time. In a case where the object to be measured is close to each base station, one estimated initial value is also needed for a first estimation to solve an estimation matrix of the initial value. In actual life, for example, in an indoor positioning scenario, the object to be measured is close to each base station. In this case, an estimated initial value (i.e., the initial positioning estimated value in the embodiment) is needed. Therefore, in the embodiment of the present disclosure, the introduction of the simulated annealing algorithm into the process of solving the initial positioning estimated value of the object to be measured is to assist the Chan algorithm in initial positioning estimation, i.e., to obtain the initial positioning estimated value.

At S120, at least two distance measurement values are screened based on a preset error threshold to obtain a target distance measurement value.

In the embodiment, the at least two distance measurement values are distances obtained by measuring the distance between the object to be measured and a target base station for at least two times. In the embodiment, the distance between the object to be measured and the target base station may be measured for multiple times to obtain a plurality of distance measurement values. However, in the actual measurement process, there are distance measurement values with large errors. To realize the accurate measurement of the object to be measured, a preset error threshold may be configured for screening distance measurement values, so as to obtain an accurate target distance measurement value. The number of target distance measurement values may be one or more, depending on the configured preset error threshold and the accuracy of measurement of the object to be measured by the user. That is, in the case of high accuracy of measurement of the object to be measured by the user, a larger preset error threshold is configured; or otherwise, a lower preset error threshold is configured. In the embodiment, the coordinate value of the target base station is a real coordinate value, while the coordinate value of the object to be measured is the initial positioning estimated value.

In the embodiment, a corresponding estimated distance value may be calculated according to the coordinate value of the target base station and the coordinate value of the object to be measured. Then, the estimated distance value is compared with the distance measurement values obtained by multiple measurements, and the distance measurement values are screened according to the results of comparison and the preset error threshold, so as to obtain an accurate target distance value.

At S130, the position of the object to be measured is determined according to a multi-target-source Taylor series algorithm, the target distance measurement values and the initial positioning estimated values.

In the embodiment, the multi-target-source Taylor series algorithm refers to a Taylor series algorithm which involves the distance measurement values of a plurality of objects to be measured in calculation. In the embodiment, by performing cooperative defining based on the multi-target-source Taylor series algorithm and the Chan algorithm, the position of the object to be measured can be effectively estimated, and compared with common algorithms, the multi-target-source Taylor series algorithm and the Chan algorithm are more accurate and effective in a case where the error does not comply with the zero-mean Gaussian distribution.

In an embodiment, the determining an initial positioning estimated value of an object to be measured by a simulated annealing algorithm and a first preset positioning algorithm includes:

determining an initial coordinate estimated value of the object to be measured according to the simulated annealing algorithm; and, determining the initial positioning estimated value of the object to be measured based on the first preset positioning algorithm and the initial coordinate estimated value.

In an embodiment, the determining an initial coordinate estimated value of the object to be measured according to the simulated annealing algorithm includes:

calculating preset target functions according to randomly generated initial coordinate values and distance measurement values, the distance measurement values being the distances obtained by measuring the distance between the object to be measured and the target base station; determining an increment value between two preset target functions corresponding to the two randomly generated initial coordinate values; and, in the case of the increment value satisfying a preset criterion, a current number of iterations reaching a preset threshold number of iterations and a current temperature in the simulated annealing algorithm reaching an end temperature, using a latest randomly generated initial coordinate value as the initial coordinate estimated value of the object to be measured.

In an embodiment, the preset criterion includes one of the followings:

in the case of the increment value being less than or equal to 0, accepting the latest randomly generated initial coordinate value and reducing the current temperature; and, in the case of the increment value being greater than 0, accepting the latest randomly generated initial coordinate value at a first preset probability.

In an embodiment, determining the initial positioning estimated value of the object to be measured based on the first preset positioning algorithm and the initial coordinate estimated value includes:

calculating a first preset diagonal matrix in the first preset positioning algorithm according to the initial coordinate estimated value, the first preset diagonal matrix being a matrix formed by a real distance between each target base station and the object to be measured; calculating a corresponding first estimated value according to the first preset diagonal matrix and a preset noise vector covariance matrix; obtaining a second estimated value according to the first estimated value and a preset estimation error; and, determining the initial positioning estimated value of the object to be measured according to the second estimated value, a second preset diagonal matrix and the known coordinate value of the target base station, the second preset diagonal matrix being a matrix formed by the coordinate value of the object to be measured, the coordinate value of the target base station and the estimated distance value between the object to be measured and the target base station.

In the embodiment, the implementation step of obtaining the initial solution (i.e., the initial positioning estimated value in the above embodiment) by the improved Chan algorithm based on the simulated annealing algorithm includes:

assuming that there are totally N base stations in a scene, and for each object to be measured, setting the preset target function of the simulated annealing algorithm as:

$$J_\omega = \sum_{i=1}^{N} |R_i - R_i'|, \tag{6}$$

where $R_i$ is the estimated distance value between the object to be measured and the target base station (the base station with known coordinate value), and $$R_i'$$

is the distance measurement value between the object to be measured and the target base station. The preset target function means that, the estimated coordinates are more accurate if an absolute value of the difference between the $R_i$ obtained by utilizing the estimated coordinates of the object to be measured and the distance measurement value $$R_i'$$

is smaller.

In the embodiment, the improved Chan algorithm based on the simulated annealing algorithm includes the following steps.

At step I, an initial solution $\omega$ is randomly generated, and a preset target function $J_\omega$ is calculated, where the current number of iterations is k=0, the current temperature is $t_0=t_{max}$ and $r \in (0,1)$ is used to control temperature reduction and annealing. In the embodiment, the initial solution is the randomly generated initial coordinate value in the above embodiment.

At step II, a new solution $\omega'$ is generated by disturbance, and a preset target function $J_{\omega'}$ is calculated.

At step III, an increment value $\Delta J = J_{\omega'} - J_\omega$ is calculated.

At step IV, if $\Delta J \leq 0$, the new resolution $\omega = \omega'$ is accepted, $J_\omega = J_{\omega'}$, k=k+1 and the temperature is reduced as $t_k = rt_{k-1}$; or otherwise, the new resolution is accepted according to a Metropolis criterion, that is, the new resolution is accepted at a first preset probability (e.g., $e^{-\Delta J/t_k}$).

At step V, a determination is made as to whether the preset number of iterations threshold is reached; and, step 2 is continuously executed if the preset number of iterations threshold is not reached.

At step VI, a determination is made as to whether an end condition is satisfied, where the end condition is that the end temperature is reached; if the end condition is satisfied, a final result is output; and, if the end condition is not satisfied, the number of iterations is reset as k=0, and the initial temperature is reduced as $t_0 = rt_{max}$.

At step VII, the coordinate estimated initial value (x', y') is obtained.

At step VIII, the first preset diagonal matrix B in the Chan algorithm is calculated by utilizing the initial value and then substituted into the formula (3) to obtain $\phi$, and a first lease square solution $$Z_a^0$$

is obtained by the formula (4), that is, $(x_0, y_0, R_0)$ is obtained.

At step IX, since the relationship among x, y and R is not taken into consideration in the first least square, the relationship among the three will be taken into consideration in the second least square, thereby realizing higher positioning accuracy. A set of error equations is constructed by utilizing the first estimated values for second estimation.

$$\begin{cases} Z_1 = x_0 + e_1 \\ Z_2 = y_0 + e_2 \\ Z_3 = R_0 + e_3 \end{cases} \tag{7}$$

where $Z_i$ denotes an $i^{th}$ component in $Z_a$, and $e_i$ denotes an estimation error of $Z_a$.

A new error vector is defined as:

$$\psi' = h' - G'z', \tag{8}$$

where $$h' = \begin{bmatrix} (Z_1 - X_1)^2 \\ (Z_2 - Y_1)^2 \\ Z_3^2 \end{bmatrix} \quad G' = \begin{bmatrix} 1 & 0 \\ 0 & 1 \\ 1 & 1 \end{bmatrix} \quad z' = \begin{bmatrix} (x_0 - X_1)^2 \\ (y_0 - y_1)^2 \end{bmatrix}, \tag{9}$$

where $(X_1, Y_1)$ denotes the known coordinates of a base station 1.

The covariance matrix of $\psi'$ is:

$$\varphi' = E(\psi'\psi'^T) = 4B'Cov(Z)B', \tag{10}$$

where the second preset diagonal matrix is B'=diag($x_0-X_1$, $y_0-Y_1$, $R_0$), and $$\text{Cov }(Z) = E\left(\begin{bmatrix} e_1 \\ e_2 \\ e_3 \end{bmatrix}[e_1 \quad e_2 \quad e_3]\right).$$

Similarly, the above estimation method is adopted to obtain:

$$Z' = (G'^T\varphi'^{-1}G')^{-1}G'^T\varphi'^{-1}h'.$$

At step X, a final estimated position is obtained:

$$Z = \pm\sqrt{Z'} + \begin{pmatrix} X_1 \\ Y_1 \end{pmatrix}.$$

In the embodiment, the final estimated position Z is the initial positioning estimated value of the object to be measured in the above embodiment.

In an embodiment, the screening at least two distance measurement values based on a preset error threshold to obtain a target distance measurement value includes: determining a distance measurement error value between the initial positioning estimated value of the object to be measured and the target base station; determining a corresponding cumulative distribution function according to the distance measurement error value; determining the corresponding preset error threshold according to the cumulative distribution function; and, screening the at least two distance measurement values according to the preset error threshold to obtain the target distance measurement value.

In the embodiment, the screening the distance measurement values between the target base station and the object to be measured based on the preset error threshold to optimize Taylor positioning includes the following step.

Since the measured values may have delay errors caused by NLOS or multipath and the Taylor series expansion algorithm is sensitive to the initial value, after the initial estimated value is obtained, the data with very large errors needs to be screened by utilizing the threshold before starting the Taylor algorithm.

FIG. 2 is a schematic diagram showing a theoretical distance measurement value range according to an embodiment of the present disclosure. As shown in FIG. 2, A and B are the positions of the base stations, T is the real position of the object to be measured, e is the expectation of the measurement error, and the equations of circles are:

$$R_{i,A} = \sqrt{(x_i - X_A)^2 + (y_i - Y_A)^2}$$

$$R_{i,B} = \sqrt{(x_i - X_B)^2 + (y_i - Y_B)^2}$$

Theoretically, the distance measurement values of A and B are between the radius of a large circle and the radius of a small circle. Since one initial value has been obtained previously according to the improved Chan algorithm of the simulated annealing algorithm, the initial value is substituted to obtain an error between each base station and the initial value, and a cumulative distribution function is calculated. For example, errors above 90% may be removed, so that certain performance improvement can be achieved and some data can be screened out.

It is assumed that there are totally N base stations and M objects to be measured in the scene. Since the distance measurement values between objects to be measured are not taken into consideration in the conventional Taylor series expansion algorithm, some useful information is lost, resulting in the reduction of positioning accuracy.

In the original Taylor algorithm, calculation is performed by utilizing the distances between objects to be measured and base stations, that is:

$$\begin{cases} R_{i,j} = \sqrt{(x_i - X_j)^2 + (y_i - Y_j)^2}, \ i < 1 \\ R_{M,N} = \sqrt{(x_M - X_N)^2 + (y_M - Y_N)^2} \end{cases}, \qquad (11)$$

where $R_{i,j}$ denotes the distance measurement value between the object to be measured and the known base station. To realize more accurate positioning, all position information may be utilized with the distance measurement values between objects to be measured to establish a set of equations.

$$\begin{cases} R'_{i,j} = \sqrt{(x_i - x_j)^2 + (y_i - y_j)^2}, \ i < j \\ \vdots \\ R'_{M-1,M} = \sqrt{(x_{M-1} - x_M)^2 + (y_{M-1} - y_M)^2} \end{cases}, \qquad (12)$$

where $(x_i, y_i)$ denotes the coordinate value of the object to be measured, $(X_i, Y_i)$ denotes the coordinate value of the known base station, $$R'_{i,j}$$

denotes the distance measurement value between objects to be measured, and $R_{i,j}$ denotes the distance measurement value between the object to be measured and the known base station.

In an embodiment, the determining the position of the object to be measured according to a multi-target-source Taylor series algorithm, the target distance measurement values and the initial positioning estimated values includes: forming a first matrix by utilizing a distance measurement error value between two objects to be measured and distance measurement error values between the objects to be measured and the target base station; forming a second matrix by utilizing the differences between the initial positioning estimated values and the estimated coordinate values of the objects to be measured; forming a third matrix by utilizing the target distance measurement values between the objects to be measured and the target base station and a previous estimated distance value between the two objects to be measured; determining a corresponding fourth matrix based on a preset positioning model and according to the first matrix, the second matrix and the third matrix; recursively calculating the second matrix based on a weighted least square method, the fourth matrix, the third matrix and a preset covariance matrix until a variation between the estimated coordinate value and the initial positioning estimated value of the object to be measured is less than a preset threshold; and, using the initial positioning estimated value corresponding to the variation less than the preset threshold as the position of the object to be measured.

In the embodiment, after the initial solution is obtained, substituting the initial solution into the multi-target-source Taylor series improved algorithm includes:

performing Taylor series expansion at the initial values $$(x_1^0, y_1^0), \dots, (x_M^0, y_M^0)$$

(i.e., the initial positioning estimated values in the above embodiment; in this case, the initial positioning estimated values of a plurality of objects to be measured (1, 2 ... M)) of the objects to be measured to remove components higher than two order, to obtain the following set of equations:

$$R'_{1,2} - \hat{R}'_{1,2} = \frac{\Delta x_1(x_1^0 - x_2^0)}{\hat{R}'_{1,2}} + \frac{\Delta y_1(y_1^0 - y_2^0)}{\hat{R}'_{1,2}} - \frac{\Delta x_2(x_1^0 - x_2^0)}{\hat{R}'_{1,2}} - \frac{\Delta y_2(y_2^0 - y_2^0)}{\hat{R}'_{1,2}} + e_{1,2} \qquad (13)$$

$$\vdots$$

$$R'_{i,j} - \hat{R}'_{i,j} = \frac{\Delta x_i(x_i^0 - x_j^0)}{\hat{R}'_{i,j}} + \frac{\Delta y_i(y_i^0 - y_j^0)}{\hat{R}'_{i,j}} - \frac{\Delta x_j(x_i^0 - x_j^0)}{\hat{R}'_{i,j}} - \frac{\Delta y_j(y_i^0 - y_j^0)}{\hat{R}'_{i,j}} + e_{i,j}$$

$$\vdots$$

$$R'_{M-1,M} - \hat{R}'_{M-1,M} = \frac{\Delta x_{M-1}(x_{M-1}^0 - x_M^0)}{\hat{R}'_{M-1,M}} + \frac{\Delta y_{M-1}(y_{M-1}^0 - y_M^0)}{\hat{R}'_{M-1,M}}$$

$$- \frac{\Delta x_M(x_{M-1}^0 - x_M^0)}{\hat{R}'_{M-1,M}} - \frac{\Delta y_M(y_{M-1}^0 - y_M^0)}{\hat{R}'_{M-1,M}} + e_{M-1,M} \qquad ,$$

$$R_{1,2} - \hat{R}_{1,2} = \frac{\Delta x_1(x_1^0 - X_2)}{\hat{R}'_{1,2}} + \frac{\Delta y_1(y_1^0 - Y_2)}{\hat{R}'_{1,2}} + e'_{1,2}$$

$$\vdots$$

$$R_{i,j} - \hat{R}_{i,j} = \frac{\Delta x_i(x_i^0 - X_j)}{\hat{R}_{i,j}} + \frac{\Delta y_i(y_i^0 - Y_j)}{\hat{R}_{i,j}} + e'_{i,j}$$

$$\vdots$$

$$R_{M,N} - \hat{R}_{M,N} = \frac{\Delta x_M(x_M^0 - X_N)}{\hat{R}_{M,N}} + \frac{\Delta y_M(y_M^0 - Y_N)}{\hat{R}_{M,N}} e'_{M,N}$$

where $$\hat{R}'_{i,j}$$

is the previous estimated distance value between the objects to be measured; $R_{i,j}$ is the estimated distance value between the object to be measured and the known base station;

$$\Delta x_i = x_i - x_i^0; \Delta y_i = y_i - y_i^0;$$

$e_{i,j}$ is the distance measurement error between the objects to be measured; and $$e'_{i,j}$$

is the distance measurement error between the object to be measured and the known base station.

The positioning model is obtained as follows:

$$h = G\Delta + E, \tag{14}$$

where $$h = \begin{bmatrix} R'_{1,2} - \hat{R}'_{1,2} \\ \vdots \\ R'_{M-1,M} - \hat{R}'_{M-1,M} \\ R_{1,2} - \hat{R}_{1,2} \\ \vdots \\ R_{M,N} - \hat{R}_{M,N} \end{bmatrix} \quad \Delta = \begin{bmatrix} \Delta x_1 \\ \Delta y_1 \\ \vdots \\ \Delta x_M \\ \Delta y_M \end{bmatrix} \quad E = \begin{bmatrix} e_{1,2} \\ \vdots \\ e_{M-1,M} \\ e'_{1,2} \\ \vdots \\ e'_{M,N} \end{bmatrix}$$

$$G = \begin{bmatrix} \dfrac{(x_1^0 - x_2^0)}{\hat{R}'_{1,2}} & \dfrac{(y_1^0 - y_2^0)}{\hat{R}'_{1,2}} & \dfrac{-(x_1^0 - x_2^0)}{\hat{R}'_{1,2}} & \dfrac{-(y_1^0 - y_2^0)}{\hat{R}'_{1,2}} & \cdots & 0 & 0 & 0 & 0 \\ \vdots & \vdots & \vdots & \vdots & \vdots & \vdots & \vdots & \vdots & \vdots \\ 0 & 0 & 0 & 0 & \cdots & \dfrac{(x_{M-1}^0 - x_M^0)}{(\hat{R}'_{M-1,M})} & \dfrac{(y_{M-1}^0 - y_M^0)}{(\hat{R}'_{M-1,M})} & \dfrac{-(x_{M-1}^0 - x_M^0)}{(\hat{R}'_{M-1,M})} & \dfrac{-(y_{M-1}^0 - y_M^0)}{(\hat{R}'_{M-1,M})} \\ \dfrac{(x_1^0 - X_2)}{\hat{R}_{1,2}} & \dfrac{(y_1^0 - Y_2)}{\hat{R}_{1,2}} & \cdots & \cdots & \cdots & \cdots & \cdots & 0 & 0 \\ \vdots & \vdots & \vdots & \vdots & \vdots & \vdots & \vdots & \vdots & \vdots \\ 0 & 0 & \cdots & \cdots & \cdots & \cdots & \cdots & \dfrac{(x_M^0 - X_N)}{\hat{R}_{M,N}} & \dfrac{(y_M^0 - Y_N)}{\hat{R}_{M,N}} \end{bmatrix}$$

$\Delta$ may be estimated by performing WLS on the formula (14):

$$\Delta = (G^T Q^{-1} G)^{-1} G^T Q^{-1} h, \tag{15}$$

where Q denotes the covariance matrix of TDOA measured values. In the second recursive calculation, let the following holds:

$$\begin{bmatrix} x_1^1 \\ y_1^1 \\ \vdots \\ x_M^1 \\ y_M^1 \end{bmatrix} = \begin{bmatrix} x_1^0 + \Delta x_1 \\ y_1^0 + \Delta y_1 \\ \vdots \\ x_M^0 + \Delta x_M \\ y_M^0 + \Delta y_M \end{bmatrix}. \tag{16}$$

The calculation is repeated for multiple times until both $\Delta x_i$ and $\Delta y_i$ are small enough and satisfy a set threshold $\varepsilon$:

$$\sum_{i=1}^{M} (|\Delta x_i| + |\Delta y_i|) < \varepsilon. \tag{17}$$

In this case, the value of $(x_i, y_i)$ is the final estimated position. In the embodiment, the value of $(x_i, y_i)$ is the position of the object to be measured in the above embodiment.

In an embodiment, FIG. 3 is a flowchart of another cooperative positioning method according to the embodiment of the present disclosure. As shown in FIG. 3, the method in the embodiment includes steps S210 to S260.

At S210, TDOA measurement values are determined.

In the embodiment, a plurality of TDOA measurement values between the object to be measured and the target base station are determined.

At S220, an initial estimated value is obtained by a simulated annealing algorithm.

In the embodiment, the initial estimated value (i.e., the initial coordinate estimated value in the above embodiment) of the object to be measured is obtained based on the simulated annealing algorithm.

At S230, the initial estimated value is substituted into a close-range Chan algorithm to obtain an initial positioning estimated value.

In the embodiment, by substituting the initial estimated value into the close-range Chan algorithm, the initial positioning estimated value of the object to be measured can be determined.

At S240, wrong data equations are removed.

In the embodiment, at least two distance measurement values are screened by utilizing a preset error threshold to obtain a target distance measurement value. That is, the wrong data equations mean the distance measurement values with large errors.

At S250, the initial positioning estimated value is substituted into a multi-target Taylor algorithm.

In the embodiment, a final result (i.e., the position of the object to be measured) can be obtained based on the multi-target Taylor algorithm, the initial positioning estimated value and the target distance measurement value.

At S260, the final result is output.

In the embodiment, after the position of the object to be measured is obtained, the position of the objected to be measured is output and displayed for reference by a user.

In an implementation, 20 objects to be measured with unknown positions and 5 base stations with known positions are randomly placed in a 100 m×100 m plane. It is assumed that the distance measurement error complies with a 10 m exponential distribution having a variance of $\delta^2=1$. The simulation step includes steps 1 to 10.

At step I, for each unknown object i to be measured, the target function of the simulated annealing algorithm is defined as:

$$J_{\omega,i} = \sum_{j=1}^{5} \left| R_j - R_j' \right|, \, i = 1, \ldots, 20.$$

At step II, for each unknown object i to be measured, the following operations are performed.

1) The number of iterations is set as 100, a temperature drop parameter is set as $r=0.98$, and an initial temperature is set as $t_{max}=100$.

2) A new solution $$\omega_i'$$

is generated by disturbance, and a target function $$J_{\omega_i'}$$

is calculated.

3) An increment $$\Delta J_i = J_{\omega_i'} - J_{\omega_i}$$

is calculated.

4) If $\Delta J \leq 0$, a new resolution $$\omega_i = \omega_i'$$

is accepted, $$J_{\omega_i} = J_{\omega_i'}, \, k = k+1$$

and the temperature is reduced as $t_k = rt_{k-1}$; or otherwise, the new resolution is accepted according to a Metropolis criterion, that is, the new resolution is accepted at a first preset probability $e^{-J_i/t_k}$.

5) A determination is made as to whether an end condition is satisfied, the end condition being that an end temperature is reached; if the end condition is satisfied, a final result is output; and, if the end condition is not satisfied, the number of iterations is reset as $k=0$, and the initial temperature is reduced as $t_0 = rt_{max}$.

6) The coordinate estimated initial value $$(x_i', y_i')$$

is obtained.

At step III, the matrix B in the Chan algorithm is calculated by utilizing the 20 initial values obtained by the simulated annealing algorithm and then substituted into the formula (3), and the first least square solution $$z_{a,i}^0$$

is obtained according to the formula (5), that is, $(x_{0,i}, y_{0,i}, R_{0,i})$ is obtained.

At step IV, since the relationship among x, y and R is not taken into consideration in the first least square, this relationship will be taken into consideration in the second least square, thereby realizing higher positioning accuracy. A set of error equations is constructed by utilizing the first estimated values for second estimation.

$$\begin{cases} Z_{1,i} = x_{0,i} + e_1 \\ Z_{2,i} = y_{0,i} + e_2 \, , \, i = 1, \ldots, 20, \\ Z_{3,i} = R_{0,i} + e_3 \end{cases}$$

where $Z_{1,i}$ denotes a first component in $Z_{a,i}$, and $e_i$ denotes an estimation error of $Z_a$.

A new error vector is defined as:

$$\psi_i' = h_i' - G_i' z_i', \, i = 1, \ldots, 20,$$

where $$h_i' = \begin{bmatrix} (Z_{1,i} - X_1)^2 \\ (Z_{2,i} - Y_1)^2 \\ Z_{3,i} \end{bmatrix} \quad G_i' = \begin{bmatrix} 1 & 0 \\ 0 & 1 \\ 1 & 1 \end{bmatrix} \quad z_i' = \begin{bmatrix} (x_{0,i} - X_1)^2 \\ (y_{0,i} - Y_1)^2 \end{bmatrix},$$

where $(X_1, Y_1)$ denotes the known coordinates of the base station 1.

The covariance matrix of $\psi'$ is:

$$\varphi_i' = E\left(\psi_i' \psi_i'^T\right) = 4 B_i' Cov(Z_i) B_i',$$

where $$B_i' = \text{diag }(x_{0,i} - X_1, y_{0,i} - Y_1, R_{0,i}),$$

$$\text{and Cov }(Z_i) = E\left(\begin{bmatrix} e_1 \\ e_2 \\ e_3 \end{bmatrix} \begin{bmatrix} e_1 & e_2 & e_3 \end{bmatrix}\right).$$

Similarly, the above estimation method is adopted to obtain:

$$Z_i' = \left(G_i' \varphi_i'^{-1} G_i'\right)^{-1} G_i'^T \varphi_i'^{-1} h_i'$$

$$h = \begin{bmatrix} R_{1,2}' - \hat{R}_{1,2}' \\ \vdots \\ R_{19,20}' - \hat{R}_{19,20}' \\ R_{1,2} - \hat{R}_{1,2} \\ \vdots \\ R_{20,5} - \hat{R}_{20,5} \end{bmatrix} \quad \Delta = \begin{bmatrix} \Delta x_1 \\ \Delta y_1 \\ \vdots \\ \Delta x_{20} \\ \Delta y_{20} \end{bmatrix} \quad E = \begin{bmatrix} e_{1,2} \\ \vdots \\ e_{19,20} \\ e_{1,2}' \\ \vdots \\ e_{20,5}' \end{bmatrix}$$

$$G = \begin{bmatrix} \dfrac{(x_1^0 - x_2^0)}{\hat{R}_{1,2}'} & \dfrac{(y_1^0 - y_2^0)}{\hat{R}_{1,2}'} & \dfrac{-(x_1^0 - x_2^0)}{\hat{R}_{1,2}'} & \dfrac{-(y_1^0 - y_2^0)}{\hat{R}_{1,2}'} & \cdots & 0 & 0 & 0 & 0 \\ \vdots & \vdots & \vdots & \vdots & & \vdots & \vdots & \vdots & \vdots \\ 0 & 0 & 0 & 0 & \cdots & \dfrac{(x_{19}^0 - x_{20}^0)}{(\hat{R}_{19,20}')} & \dfrac{(y_{19}^0 - y_{20}^0)}{(\hat{R}_{19,20}')} & \dfrac{-(x_{19}^0 - x_{20}^0)}{(\hat{R}_{19,20}')} & \dfrac{-(y_{19}^0 - y_{20}^0)}{(\hat{R}_{19,20}')} \\ \dfrac{(x_1^0 - X_1)}{\hat{R}_{1,2}} & \dfrac{(y_1^0 - Y_2)}{\hat{R}_{1,2}} & \cdots & \cdots & \cdots & \cdots & \cdots & 0 & 0 \\ \vdots & \vdots & \vdots & \vdots & \vdots & \vdots & \vdots & \vdots & \vdots \\ 0 & 0 & \cdots & \cdots & \cdots & \cdots & \cdots & \dfrac{(x_{20}^0 - X_5)}{\hat{R}_{20,5}} & \dfrac{(y_{20}^0 - Y_5)}{\hat{R}_{20,5}} \end{bmatrix}$$

At step 5, the positions $$Z_i = \pm \sqrt{Z_i'} + \begin{pmatrix} X_1 \\ Y_1 \end{pmatrix},$$

$i=1, \ldots, 20$ of 20 objects to be measured estimated by the Chan algorithm are obtained.

At step VI, a cumulative distribution function $$\sqrt{(X_i - Z_{k,x})^2 + (Y_i - Z_{k,y})^2}, i = 1, \ldots, 5$$

between the coordinates of each base station and the initial value is calculated respectively by utilizing initial position estimations $Z_k$, k=1, . . . , 20 obtained by the improved Chan algorithm, and the function with an error above 90% is removed.

At step VII, a set of equations is established:

$$\begin{cases} R_{i,j}' = \sqrt{(x_i - x_j)^2 + (y_i - y_j)^2}, i < j \\ \vdots \\ R_{19,20}' = \sqrt{(x_{19} - x_{20})^2 + (y_{19} - y_{20})^2} \\ R_{i,j} = \sqrt{(x_i - X_j)^2 + (y_i - Y_j)^2}, i < j \\ \vdots \\ R_{20,5} = \sqrt{(x_{20} - X_5)^2 + (y_{20} - Y_5)^2} \end{cases}$$

At step VIII, expansion is performed at the estimated positions $$\left(x_1^0, y_1^0\right), \ldots, \left(x_{20}^0, y_{20}^0\right)$$

previously obtained by the Chan algorithm, to obtain through processing:

At step IX, $\Delta$ may be estimated by WLS:

$$\Delta = \left(G^T Q^{-1} G^T\right)^{-1} G^T Q^{-1} h,$$

where $Q$ denotes the covariance matrix of TDOA measurement values. In the second recursive calculation, let the following holds:

$$\begin{bmatrix} x_1^1 \\ y_1^1 \\ \vdots \\ x_{20}^1 \\ y_{20}^1 \end{bmatrix} = \begin{bmatrix} x_1^0 + \Delta x_1 \\ y_1^0 + \Delta y_1 \\ \vdots \\ x_{20}^0 + \Delta x_{20} \\ y_{20}^0 + \Delta y_{20} \end{bmatrix}.$$

The calculation is repeated for at most 50 times until both $\Delta x_i$ and $\Delta y_i$ are small enough.

At step X, the final estimated results $(x_1, y_1), \ldots,$ $(x_{20}, y_{20})$ are obtained.

FIG. 4 is a diagram showing analysis of errors of different algorithms according to an embodiment of the present disclosure. As shown in FIG. 4, the improved Chan algorithm based on the simulated annealing algorithm and the Taylor series algorithm have the smallest measurement errors.

Figure 5:
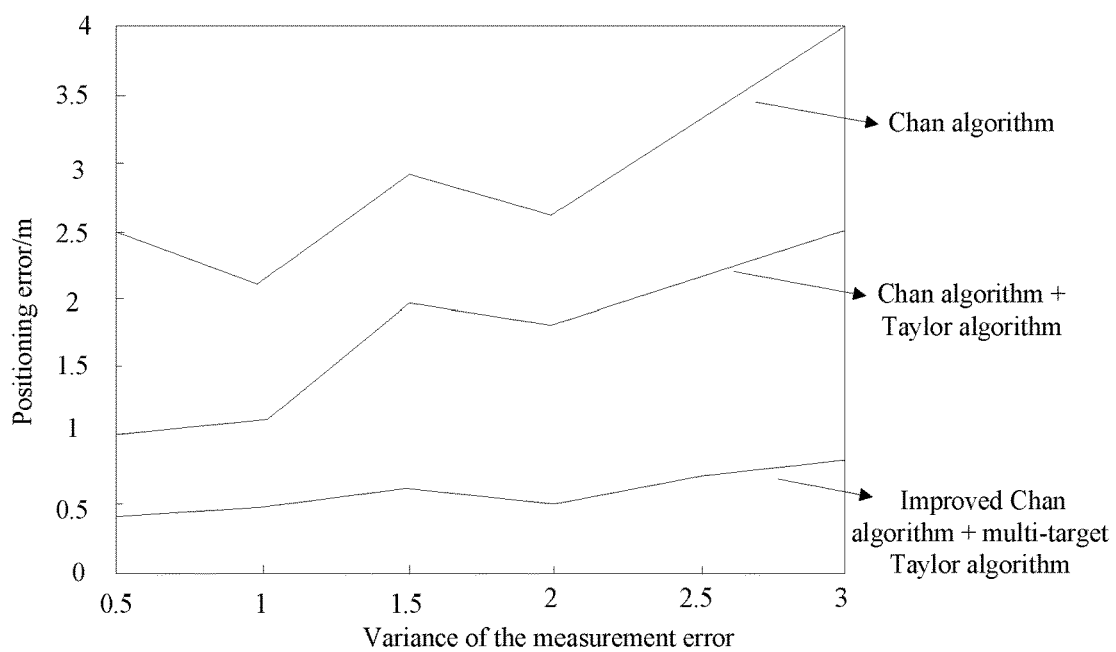
FIG. 5 is a schematic diagram showing comparison of positioning errors of different algorithms according to an embodiment of the present disclosure.

The relationship between the variance of the error and the positioning accuracy is analyzed under the circumstance of all others being unchanged. FIG. 5 is a schematic diagram showing comparison of positioning errors of different algorithms according to an embodiment of the present disclosure. As shown in FIG. 5, the improved Chan algorithm based on the simulated annealing algorithm and the Taylor series algorithm have the smallest positioning errors.

Figure 6:
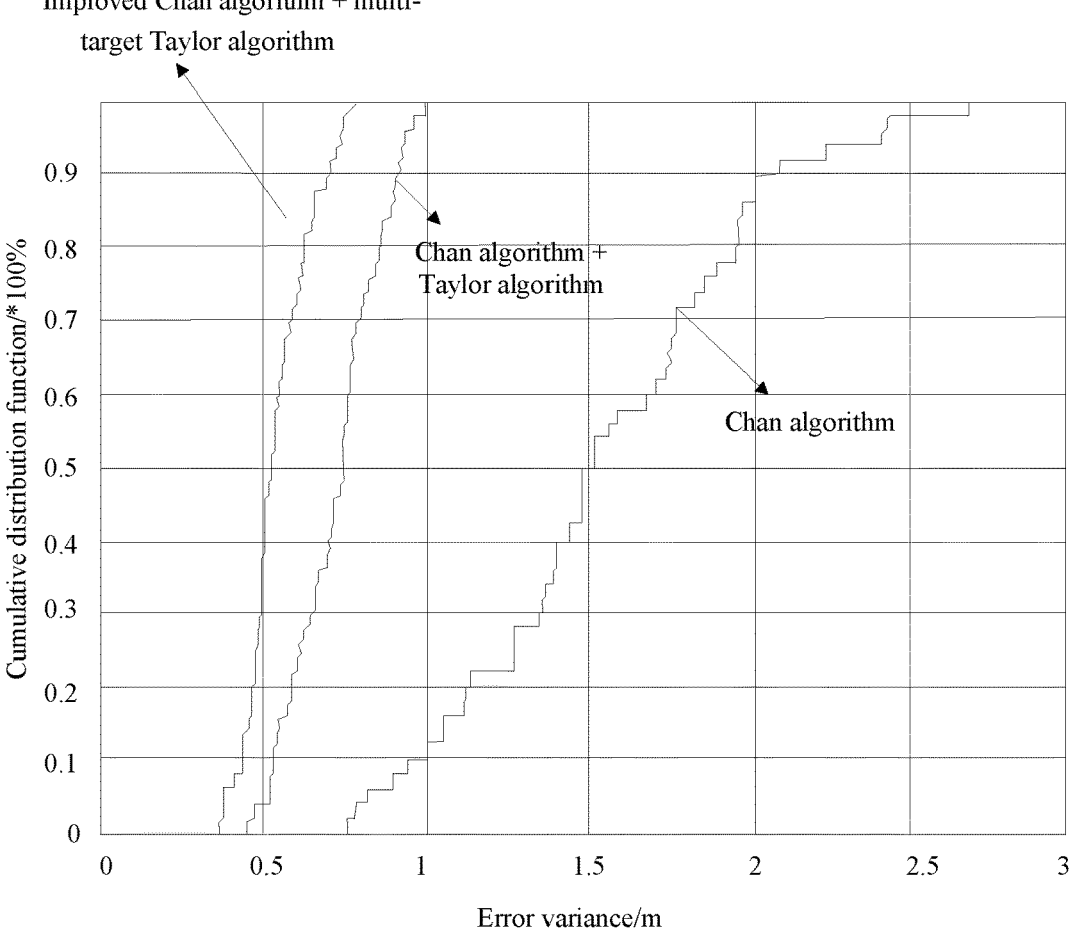
FIG. 6 is a diagram of the relationship between cumulative distributions and error measurement methods according to an embodiment of the present disclosure.

When $\delta^2 = 0.5$, the test is repeated for 50 times to test the relationship between the positioning error distribution function and the variance. FIG. 6 is a diagram of the relationship between cumulative distributions and error measurement methods according to an embodiment of the present disclosure. As shown in FIG. 6, the improved Chan algorithm based on the simulated annealing algorithm and the Taylor series algorithm have the smallest cumulative distributions and measurement error variances.

Figure 7:
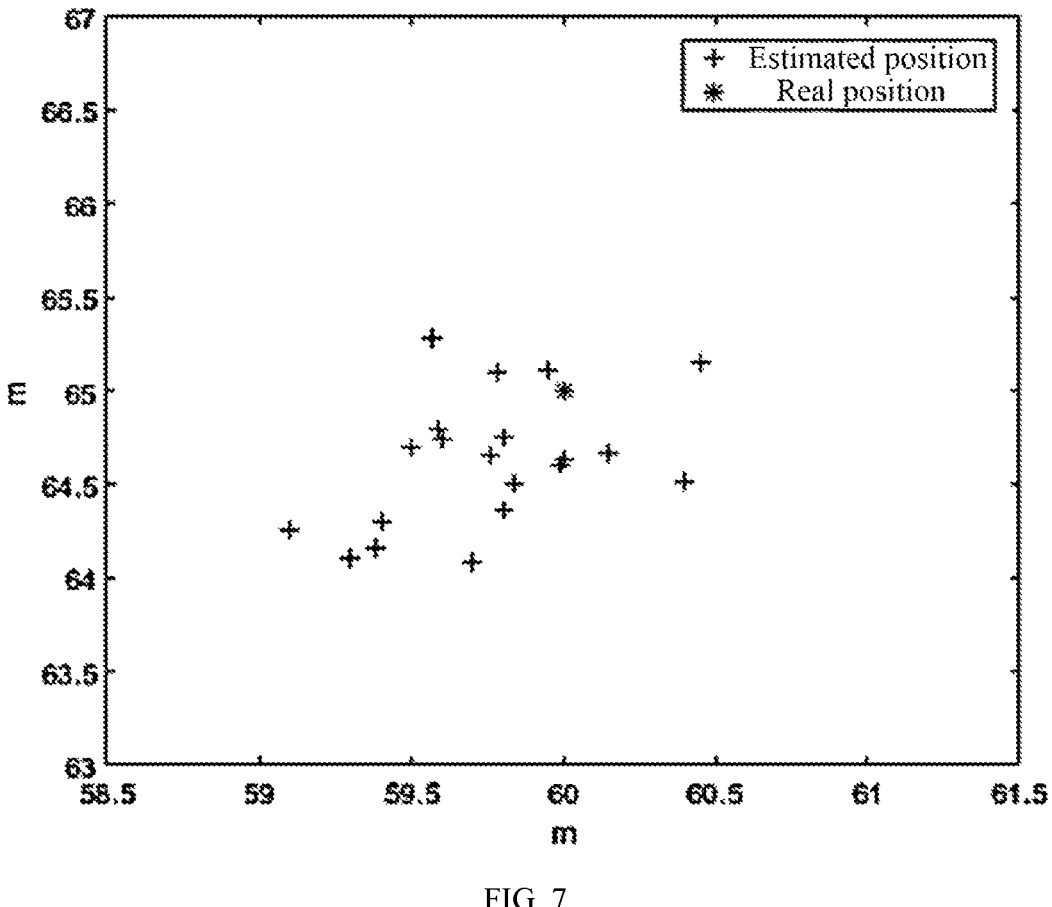
FIG. 7 is a schematic diagram of the distribution of positioning points according to an embodiment of the present disclosure.

In a case where a real object is located at the point (60, 65), the algorithm is run for 20 times to obtain the distribution of positioning points. FIG. 7 is a schematic diagram of the distribution of positioning points according to an embodiment of the present disclosure. As shown in FIG. 7, the estimated positioning points are concentrated near a real position of the object to be measured.

Figure 8:
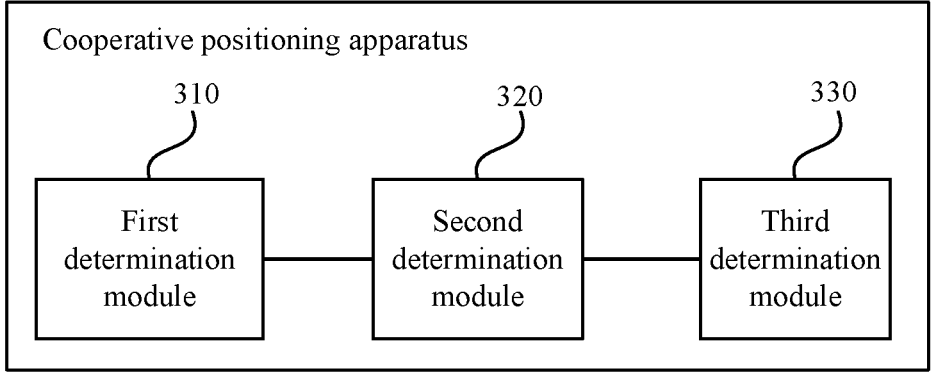
FIG. 8 is a structural block diagram of a cooperative positioning apparatus according to an embodiment of the present disclosure.

FIG. 8 is a structural block diagram of a cooperative positioning apparatus according to an embodiment of the present disclosure. As shown in FIG. 8, the cooperative positioning apparatus in the embodiment includes a first determination module 310, a second determination module 320 and a third determination module 330.

The first determination module 310 is configured to determine an initial positioning estimated value of an object to be measured by a simulated annealing algorithm and a first preset positioning algorithm. The second determination module 320 is configured to screen at least two distance measurement values based on a preset error threshold to obtain a target distance measurement value, the at least two distance measurement values being distances obtained by measuring the distance between the object to be measured and a target base station for at least two times. The third determination module 330 is configured to determine the position of the object to be measured according to a multi-target-source Taylor series algorithm, the target distance measurement value and the initial positioning estimated value.

The cooperative positioning apparatus provided in the embodiment is configured to implement the cooperative positioning method in the embodiment shown in FIG. 1, and the implementation principle and technical effects of the cooperative positioning apparatus provided in the embodiment are similar to those of the cooperative positioning method and will not be repeated here.

In an embodiment, the first determination module 310 includes a first determination unit and a second determination unit.

The first determination unit is configured to determine an initial coordinate estimated value of the object to be measured according to the simulated annealing algorithm. The second determination unit is configured to determine the initial positioning estimated value of the object to be measured based on the first preset positioning algorithm and the initial coordinate estimated value.

In an embodiment, the first determination unit includes a first determination sub-unit, a second determination sub-unit and a third determination sub-unit.

The first determination sub-unit is configured to calculate preset target functions according to randomly generated initial coordinate values and distance measurement values, the distance measurement values being the distances obtained by measuring the distance between the object to be measured and the target base station. The second determination sub-unit is configured to determine an increment value between two preset target functions corresponding to the two randomly generated initial coordinate values. The third determination sub-unit is configured to, in the case of the increment value satisfying a preset criterion, a current number of iterations reaching a preset threshold number of iterations and a current temperature in the simulated annealing algorithm reaching a final temperature, use a latest randomly generated initial coordinate value as the initial coordinate estimated value of the object to be measured.

In an embodiment, the preset criterion includes one of the following:

in the case of the increment value being less than or equal to 0, accepting the latest randomly generated initial coordinate value and reducing the current temperature; and, in the case of the increment value being greater than 0, accepting the latest randomly generated initial coordinate value at a first preset probability.

In an embodiment, the second determination unit includes a fourth determination sub-unit, a fifth determination sub-unit, a sixth determination sub-unit and a seventh determination sub-unit.

The fourth determination sub-unit is configured to calculate a first preset diagonal matrix in the first preset positioning algorithm according to the initial coordinate estimated value, the first preset diagonal matrix being a matrix formed by a real distance between each target base station and the object to be measured. The fifth determination sub-unit is configured to calculate a corresponding first estimated value according to the first preset diagonal matrix and a preset noise vector covariance matrix. The sixth determination sub-unit is configured to obtain a second estimated value according to the first estimated value and a preset estimation error. The seventh determination sub-unit is configured to determine the initial positioning estimated value of the object to be measured according to the second estimated value, a second preset diagonal matrix and known coordinate value of the target base station, the second preset diagonal matrix being a matrix formed by the coordinate value of the object to be measured, the coordinate value of the target base station and an estimated distance value between the object to be measured and the target base station.

In an embodiment, the second determination module 320 includes a third determination unit, a fourth determination unit, a fifth determination unit and a sixth determination unit.

The third determination unit is configured to determine a distance measurement error value between the initial positioning estimated value of the object to be measured and the target base station. The fourth determination unit is configured to determine a corresponding cumulative distribution function according to the distance measurement error value. The fifth determination unit is configured to determine a corresponding preset error threshold according to the cumulative distribution function. The sixth determination unit is configured to screen the at least two distance measurement values according to the preset error threshold to obtain the target distance measurement value.

In an embodiment, the third determination module 330 includes a seventh determination unit, an eighth determination unit, a ninth determination unit, a tenth determination unit, a calculation unit and an eleventh determination unit.

The seventh determination unit is configured to form a first matrix by utilizing the distance measurement error value between two objects to be measured and distance measurement error values between the objects to be measured and the target base station. The eighth determination unit is configured to form a second matrix by utilizing the differences between the initial positioning estimated values and the estimated coordinate values of the objects to be measured. The ninth determination unit is configured form a third matrix by utilizing the distance measurement values between the objects to be measured and the target base station and a previous estimated distance value between the two objects to be measured. The tenth determination unit is configured to determine a fourth matrix based on a preset positioning model and according to the first matrix, the second matrix and the third matrix. The calculation unit is configured to recursively calculate the second matrix based on a weighted least square method, the fourth matrix, the third matrix and a preset covariance matrix until a variation between the estimated coordinate value and the initial positioning estimated value of the object to be measured is less than a preset threshold. The eleventh determination unit is configured to use the initial positioning estimated value corresponding to the variation less than the preset threshold as the position of the object to be measured.

In an embodiment, the first preset positioning algorithm is a Chan algorithm.

Figure 9:
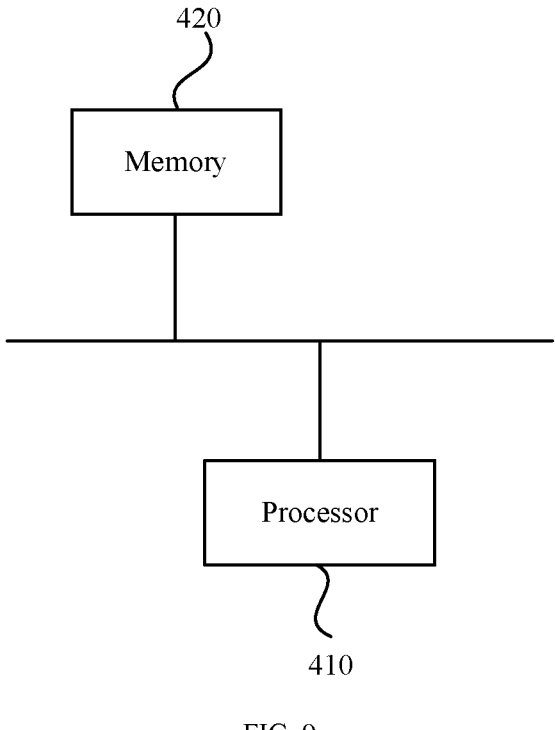
FIG. 9 is a schematic structural diagram of a device according to an embodiment of the present disclosure.

FIG. 9 is a schematic structural diagram of a device according to an embodiment of the present disclosure. As shown in FIG. 9, the device provided by the present disclosure includes a processor 410 and a memory 420. There may one or more processors 410 in the device, and FIG. 9 is illustrated by taking one processor 410 as an example. There may be one or more memories 420 in the device, and FIG. 9 is illustrated by taking one memory 420 as an example. The processor 410 and the memory 420 in the device may be connected via a bus or in other ways. FIG. 9 is illustrated by taking the processor 410 and the memory 420 being connected via a bus as an example. In the embodiment, the device is a computer device.

As a computer-readable storage medium, the memory 420 may be configured to store software programs, computer-executable programs and modules, for example, program instructions/modules corresponding to the device according to any one of the embodiments of the present disclosure (for example, the first determination module 310, the second determination module 320 and the third determination module 330 in the cooperative positioning apparatus). The memory 420 may include a program storage region and a data storage region. The program storage region may store application programs required by an operating system and at least one function, and the data storage region may store data created according to the use of the device, etc. In addition, the memory 420 may include high-speed random access memories, or may include non-volatile memories, for example, at least one magnetic disk memory device, flash memory devices or other non-volatile solid-state memory devices. In some instances, the memory 420 may include memories remotely arranged relative to the processor 410.

These remote memories may be connected to the device via a network. Examples of the network include, but not limited to, Internet, Intranet, local area networks, mobile communication networks and combinations thereof.

The device mentioned above may be configured to execute the cooperative positioning method according any one of the above embodiments, and has the corresponding functions and effects.

An embodiment of the present disclosure further provides a non-transitory computer-readable storage medium containing computer-executable instructions which, when executed by a computer processor, cause the computer processor to carry out a cooperative positioning method. The method includes steps of: determining an initial positioning estimation value of an object to be measured by a simulated annealing algorithm and a first preset positioning algorithm; screening at least two distance measurement values based on a preset error threshold to obtain a target distance measurement value, the at least two distance measurement values distances obtained by measuring the distance between the object to be measured and a target base station for at least two times; and, determining the position of the object to be measured according to a multi-target-source Taylor series algorithm, the target distance measurement value and the initial positioning estimation value.

The term "user equipment" encompasses any suitable type of wireless user equipment, for example, mobile phones, portable data processing apparatuses, portable web browsers or vehicle-mounted mobile stations.

Generally, various embodiments of the present disclosure may be implemented in hardware or dedicated circuits, software, logics or any combination thereof. For example, some aspects may be implemented in hardware, while other aspects may be implemented in firmware or software that can be executed by a controller, a microprocessor or other computing apparatuses, and the present disclosure is not limited thereto.

The embodiments of the present disclosure may be implemented by executing computer program instructions by a data processor of a mobile device, for example, in a processor entity, or by hardware, or by a combination of software and hardware. The computer program instructions may be assembly instructions, Instruction Set Architecture (ISA) instructions, machine instructions, machine-related instructions, microcodes, firmware instructions, state setting data, or source codes or target codes written in any combination of one or more programming languages.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, read-only memories (ROMs), random access memories (RAMs), optical memory devices and systems (digital video discs (DVDs) or compact disks (CDs)), etc. The computer-readable medium may include non-transient storage mediums. The data processor may be of any type suitable for the local technical environment, for example, but not limited to, general purpose computers, special purpose computers, microprocessors, digital signal processors (DSPs), application specific integrated circuits (ASICs), field-programmable gate arrays (FGPAs), and processors based on a multicore processor architecture.

What is claimed is:

1. A cooperative positioning method applied to the Global Positioning System (GPS), comprising:

determining an initial positioning estimated value of each of a plurality of objects to be measured by a simulated annealing algorithm and a Chan algorithm;

screening at least two distance measurement values based on a preset error threshold to obtain a target distance measurement value, wherein the at least two distance measurement values are measurement values obtained by measuring a distance between each object to be measured and each of a plurality of target base stations for at least two times, wherein the object to be measured is a terminal to be measured, and the target base stations are base stations with known coordinate values; and determining a position of each object to be measured according to a multi-target-source Taylor series algorithm, each target distance measurement value and each initial positioning estimated value;

wherein, determining an initial positioning estimated value of each of a plurality of objects to be measured by a simulated annealing algorithm and a Chan algorithm, comprises:

measuring a plurality of time distance of arrival (TDOA) measurement values between the object to be measured and the plurality of target base stations to obtain the distance measurement values;

receiving the distance measurement values;

determining an initial coordinate estimated value of each object to be measured according to the simulated annealing algorithm based on the distance measurement values; and determining the initial positioning estimated value of the object to be measured based on the Chan algorithm and the initial coordinate estimated value.

2. The method of claim 1, wherein, determining an initial coordinate estimated value of each object to be measured according to the simulated annealing algorithm, comprises:

calculating preset target functions according to randomly generated initial coordinate values and the distance measurement values;

determining an increment value between two preset target functions corresponding to two randomly generated initial coordinate values; and in response to the increment value satisfying a preset criterion, a current number of iterations reaching a preset threshold number of iterations and a current temperature in the simulated annealing algorithm reaching an end temperature, using a latest randomly generated initial coordinate value as the initial coordinate estimated value of the object to be measured.

3. The method of claim 2, wherein the preset criterion comprises one of:

in response to the increment value being less than or equal to 0, accepting the latest randomly generated initial coordinate value and reducing the current temperature in the simulated annealing algorithm; and in response to the increment value being greater than 0, accepting the latest randomly generated initial coordinate value at a first preset probability.

4. The method of claim 1, wherein, determining the initial positioning estimated value of each object to be measured based on the Chan algorithm and the initial coordinate estimated value comprises:

calculating a first preset diagonal matrix in the Chan algorithm according to the initial coordinate estimated value, wherein the first preset diagonal matrix is a matrix formed by a real distance between each target base station and the object to be measured;

calculating a first estimated value according to the first preset diagonal matrix and a preset noise vector covariance matrix;

obtaining a second estimated value according to the first estimated value and a preset estimation error; and determining the initial positioning estimated value of the object to be measured according to the second estimated value, a second preset diagonal matrix and known coordinate value of one target base station, wherein the second preset diagonal matrix is a matrix formed by the coordinate value of the object to be measured in the first estimated value, the known coordinate value of the one target base station and the estimated distance value between the object to be measured and each target base station in the first estimated value.

5. The method of claim 1, wherein, screening at least two distance measurement values based on a preset error threshold to obtain a target distance measurement value, comprises:

determining the distance measurement error value between the initial positioning estimated value of each object to be measured and each target base station;

determining a cumulative distribution function according to the distance measurement error value;

determining the preset error threshold according to the cumulative distribution function; and screening the at least two distance measurement values according to the preset error threshold to obtain the target distance measurement value.

6. The method of claim 1, wherein, determining a position of the object to be measured according to a multi-target-source Taylor series algorithm, each target distance measurement value and each initial positioning estimated value, comprises:

in the case of the number of the objects to be measured being 2, forming a first matrix by utilizing a distance measurement error value between the two objects to be measured and the distance measurement error value between each object to be measured and each target base station;

forming a second matrix by utilizing a difference between the initial positioning estimated value and the estimated coordinate value of each object to be measured;

forming a third matrix by utilizing the target distance measurement value between each object to be measured and each target base station and a previous estimated distance value between the two objects to be measured;

determining a fourth matrix based on a preset positioning model and according to the first matrix, the second matrix and the third matrix;

recursively calculating the second matrix based on a weighted least square method, the fourth matrix, the third matrix and a preset covariance matrix till a variation between the estimated coordinate value and the initial positioning estimated value of each object to be measured is less than a preset threshold; and taking the initial positioning estimated value corresponding to the variation less than the preset threshold as the position of the object to be measured.

7. A device, comprising a memory and at least one processor, wherein the memory is configured to store at least one program which, when executed by the at least one processor, causes the at least one processor to carry out the cooperative positioning method of claim 1.

8. A cooperative positioning apparatus applied to the Global Positioning System (GPS), comprising:

a first determination module, configured to determine an initial positioning estimated value of each of a plurality of objects to be measured by a simulated annealing algorithm and a Chan algorithm;

a second determination module, configured to screen at least two distance measurement values based on a preset error threshold to obtain a target distance measurement value, wherein the at least two distance measurement values are measurement values obtained by measuring a distance between each object to be measured and a target base station for at least two times, wherein the object to be measured is a terminal to be measured, and the target base station is a base station with known coordinate value; and a third determination module, configured to determine a position of each object to be measured according to a multi-target-source Taylor series algorithm, each target distance measurement value and each initial positioning estimated value;

wherein the first determination module further configured to:

measure a plurality of time distance of arrival (TDOA) measurement values between the object to be measured and the plurality of target base stations to obtain the distance measurement values;

receive the distance measurement values;

determine an initial coordinate estimated value of each object to be measured according to the simulated annealing algorithm based on the distance measurement values; and determine the initial positioning estimated value of the object to be measured based on the Chan algorithm and the initial coordinate estimated value.

9. A non-transitory computer-readable storage medium, storing computer programs which, when executed by a processor, cause the processor to carry out a cooperative positioning method applied to the Global Positioning System (GPS), the method comprising:

determining an initial positioning estimated value of each of a plurality of objects to be measured by a simulated annealing algorithm and a Chan algorithm;

screening at least two distance measurement values based on a preset error threshold to obtain a target distance measurement value, wherein the at least two distance measurement values are measurement values obtained by measuring a distance between each object to be measured and each of a plurality of target base stations for at least two times, wherein the object to be measured is a terminal to be measured, and the target base stations are base stations with known coordinate values; and determining a position of each object to be measured according to a multi-target-source Taylor series algorithm, each target distance measurement value and each initial positioning estimated value;

wherein, determining an initial positioning estimated value of each of a plurality of objects to be measured by a simulated annealing algorithm and a Chan algorithm, comprises:

measuring a plurality of time distance of arrival (TDOA) measurement values between the object to be measured and the plurality of target base stations to obtain the distance measurement values;

receiving the distance measurement values;

determining an initial coordinate estimated value of each object to be measured according to the simulated annealing algorithm based on the distance measurement values; and determining the initial positioning estimated value of the object to be measured based on the Chan algorithm and the initial coordinate estimated value.

* * * * *